United States Patent
Seigel

(10) Patent No.: US 9,156,381 B2
(45) Date of Patent: Oct. 13, 2015

(54) DEVICE FOR LOCKING A VEHICLE SEAT

(75) Inventor: Juergen Seigel, Schutterwald (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 732 days.

(21) Appl. No.: 13/400,950

(22) Filed: Feb. 21, 2012

(65) Prior Publication Data

US 2012/0217370 A1  Aug. 30, 2012

(30) Foreign Application Priority Data

Feb. 22, 2011  (DE) .......................... 10 2011 012 427

(51) Int. Cl.
| | | |
|---|---|---|
| E05C 3/16 | (2006.01) | |
| B60N 2/36 | (2006.01) | |
| B60N 2/015 | (2006.01) | |
| E05C 3/06 | (2006.01) | |

(52) U.S. Cl.
CPC ............ B60N 2/366 (2013.01); B60N 2/01583 (2013.01)

(58) Field of Classification Search
USPC .................................. 292/216, 201, DIG. 23
See application file for complete search history.

(56) References Cited

U.S. PATENT DOCUMENTS

| | | | |
|---|---|---|---|
| 3,421,785 A * | 1/1969 | Slattery .......................... 292/216 |
| 5,154,476 A | 10/1992 | Haider et al. |
| 5,540,117 A | 7/1996 | Hänsel et al. |
| 5,730,480 A * | 3/1998 | Takamura ................... 248/503.1 |
| 6,547,302 B1 | 4/2003 | Rubio et al. |
| 6,945,585 B1 * | 9/2005 | Liu et al. ..................... 296/65.03 |
| 7,032,973 B2 * | 4/2006 | Reubeuze ................ 297/378.13 |
| 2010/0270455 A1 | 10/2010 | Obrecht |
| 2011/0012376 A1 * | 1/2011 | Hunt et al. ..................... 292/216 |

FOREIGN PATENT DOCUMENTS

| | | |
|---|---|---|
| DE | 4439644 | 6/1995 |
| DE | 19715764 | 10/1998 |
| DE | 19806385 | 8/1999 |
| DE | 10048127 | 4/2002 |
| DE | 69924145 | 1/2006 |
| DE | 102009019510 | 12/2010 |

* cited by examiner

*Primary Examiner* — Mark Williams

(74) *Attorney, Agent, or Firm* — Reising Ethington P.C.

(57) ABSTRACT

A device for locking a vehicle seat comprises a locking pawl which may be pivoted about a first pivot between a closed position in which it engages a fitting part and an open position free of the fitting part. A locking element pivots about a second pivot axis to lock the pawl in its closed position by engagement of a first bearing surface of the locking element with a second bearing surface of the locking pawl. The locking element may further be pivoted about a third pivot axis to move it into a clamping position in which the locking element comes to bear with a first bearing point against the second bearing surface and comes to bear with a second bearing point spaced apart from the first bearing point against a third bearing surface of the locking pawl.

11 Claims, 6 Drawing Sheets a)

b)

c)

d)

DEVICE FOR LOCKING A VEHICLE SEAT

CROSS-REFERENCE TO FOREIGN APPLICATION

This application claims priority from German patent application No. 10 2011 012 427.6, filed on Feb. 22, 2011.

BACKGROUND OF THE INVENTION

The invention relates to devices for locking a vehicle seat. More specifically, the invention relates to a device for locking a vehicle seat comprising a locking pawl, which is arranged for coming into engagement with a fixed fitting part in a closed position of the locking pawl, and a locking element, which is arranged for locking the locking pawl in said closed position.

Within the meaning of the present invention, a locking device of the aforementioned type may be used for anchoring a vehicle seat to the floor or for locking a pivotable backrest of a vehicle seat.

The fixed fitting part, with which the locking pawl is in engagement in its closed position when the locking device is used for anchoring a vehicle seat to the floor is, for example, a bolt fixed to the bodywork, which is encompassed by a jaw of the locking pawl in the closed position thereof. When the locking device is used for locking a pivotable backrest of a vehicle seat, the fixed fitting part is, for example, a bolt fastened to the C-column, whilst the locking device is mounted on the pivotable backrest. The locking element serves in both cases to lock the pivotable locking pawl in its closed position.

A requirement for a device for locking a vehicle seat is that the locking pawl should not open automatically during operation of the vehicle in which the vehicle seat is installed. This applies, in particular, in the event of an impact to the vehicle, in which large forces are able to act on the locking pawl, and which are able to exert on the locking pawl a torque in the direction of its open position, the locking element having to counteract such an opening moment in order to hold the locking pawl securely in its closed position. This may be achieved, for example, by the locking element bearing against the locking pawl in the closed position thereof by self-clamping of the bearing surfaces on both the locking pawl and the locking element. The bearing with a self-clamping between the bearing surfaces of the locking pawl and the locking element, however, has the drawback that the locking device moves with difficulty when the locking pawl is intentionally opened.

In a locking device disclosed in the document DE 699 24 145 T2, the locking element comprises a bearing surface which is without eccentricity relative to the pivot axis of the locking element, and the locking pawl also comprises a bearing surface cooperating with the bearing surface of the locking element and which in the closed position of the locking pawl is also without eccentricity relative to the pivot axis of the locking element. By this arrangement of the bearing surfaces, the bearing surfaces bear against one another without self-clamping, which promotes the smooth-running of the device. For increasing the safety of the locking device in the event of an impact, it is proposed in the document that two further opposing surfaces are spaced apart from one another beyond the bearing surfaces of the locking element and the locking pawl. As result, it is intended to be achieved that a movement of the locking pawl, in the sense of an opening moment, is not able to be transmitted to the locking element. In addition to the two bearing surfaces of the locking element and the locking pawl without eccentricity relative to the pivot axis of the locking element, said two elements comprise two further opposing bearing surfaces which in the closed position of the locking pawl bear against one another and extend approximately at right angles to the two actual bearing surfaces and form therewith an angle of more than 180°. The latter two bearing surfaces, however, do not have a locking action.

A drawback with said known locking device is that it is not possible to clamp the locking pawl in its closed position in engagement with the fitting part, such that rattling noises during operation of the vehicle may be reliably avoided.

A further locking device is disclosed in DE 44 39 644 C2. In this known locking device, the locking element is provided with a clamping surface which has such a high degree of eccentricity relative to the pivot axis of the locking element that it clamps the locking pawl in its closed position and namely without self-clamping. The absence of self-clamping between the clamping surface of the locking element and the clamping surface of the locking pawl, however, in the event of impact to the vehicle, may cause the clamping surface of the locking element to slip off the clamping surface of the locking pawl. In order to prevent the locking pawl in such a case from reaching its open position, the locking element additionally has a catch surface which is configured so that it extends parallel to a displacement path between an axis of curvature of the clamping surface of the locking element and the pivot axis of the locking element.

DE 100 48 127 B4 discloses a device for locking a vehicle seat, comprising a locking pawl and a locking element, the locking element being configured as a clamping eccentric, which is configured with an eccentrically curved surface for clamping the pawl, a locking element being present in the form of a stop which is effective in the event of an impact and in this case prevents opening of the locking element. To this end, the locking element in the form of a clamping eccentric comprises an oblong hole, via which the clamping eccentric is mounted on the pivot axis of the clamping eccentric, the locking element only being effective in the event of an impact, by the clamping eccentric being displaced relative to its pivot axis, whereby a portion of the clamping eccentric moves against the locking element. In this device, therefore, play is compensated via an eccentric contour on the locking element, whilst the slot permits a displacement of the locking element in the event of an impact, so that the locking element moves against a stop in order to prevent an opening of the locking pawl.

In the two known locking devices cited above, it may be regarded as a drawback that the eccentric clamping surface for clamping the locking pawl in its closed position, in order to avoid rattling noises, always has to produce a sufficiently large counter force in order to keep the locking pawl closed which, for example, has to be implemented by a sufficiently high level of spring force which increases the force expenditure in the case of intentional opening.

DE 10 2009 019 510 A1 discloses a device for locking a vehicle seat in which the locking pawl is able to be clamped in the closed position by means of a locking element which is both pivotable and movable in a translatory manner towards the locking pawl, so that rattling noises are able to be avoided. However, the additional cost in terms of construction is a drawback in this locking device, as in this device an additional control element is required for bringing about the pivoting movement, on the one hand, and the translatory movement, on the other hand.

SUMMARY OF THE INVENTION

It is an object of the invention to improve a device for locking a vehicle seat of the type mentioned in the introduction such that it fulfils the requirements for safety in the event of an impact at low cost in terms of construction, such that it is able to be actuated easily and the locking pawl is clamped in its closed position so that rattling noises are avoided.

According to an aspect, a locking device for locking a vehicle seat is provided, comprising a locking pawl, said locking pawl being in engagement with a fitting part in a closed position and being free from the fitting part in an open position, a first pivot axis, the locking pawl being pivotable about the first pivot axis, a locking element, a second pivot axis, the locking element being pivotable about the second pivot axis, a first bearing surface present on the locking element and a second bearing surface present on the locking pawl, said first bearing surface coming to bear against the second bearing surface in a locking position of the locking element and in a first pivoted position of the locking pawl, in which said locking pawl is already in engagement with the fitting part, the first bearing surface and the second bearing surface being without eccentricity relative to the second pivot axis in the first pivoted position of the locking pawl, a third bearing surface and a third pivot axis, the locking element, when proceeding from the locking position, being pivotable about the third pivot axis into a clamping position in which, for clamping the locking pawl in the closed position, the locking element comes to bear with a first bearing point against the second bearing surface and comes to bear with a second bearing point spaced apart from the first bearing point against the third bearing surface.

Contrary to the locking device disclosed in DE 699 24 145 T2, the locking device according to the invention permits a clamping of the locking pawl in its closed position so that rattling noises during operation of the vehicle are avoided. The clamping of the locking pawl in its closed position, however, is not achieved as in the other known locking devices by an eccentric clamping surface on the locking element, but by a "two-point bearing" of the locking element on the second and third bearing surfaces.

Moreover, in the locking device according to the invention it is provided, in order to transfer the locking element into the "two-point bearing" position, that proceeding from the locking position the locking element is able to be pivoted about a third pivot axis into the clamping position. This means that proceeding from the locking position the locking element is no longer pivoted about the second pivot axis but about a third pivot axis spaced apart therefrom.

The third pivot axis is not, as the first or second pivot axis, a pivot axis which is fixed relative to the housing of the device, i.e. for example is not formed by an axial pin, but the third pivot axis is a geometric axis, preferably parallel to the second pivot axis, which is produced by the movement sequence of the locking element during the transition from the locking position into the clamping position.

For intentional opening of the locking device, the locking element is again transferred from the "two-point bearing" position into the locking position, which is possible using smaller forces than with an eccentric clamping surface. From the locking position, the locking element may then also be transferred easily into the fully open position, as in the locking position the two bearing surfaces of the locking element and the locking pawl are without eccentricity relative to the second pivot axis of the locking element. The locking device according to the invention thus does not require large forces in order to perform the closing and opening movements so that it is able to be opened intentionally, in a manner which is smooth-running and the closing movement is also smooth-running.

In the event of an impact, however, the locking element is only able to pivot back from the clamping position into the locking position and not further as, by the bearing of the locking element without eccentricity on the second bearing surface of the locking pawl, said locking pawl is not able to exert a further opening moment on the locking element.

In the locking device according to the invention, therefore, safety in the event of impact load is provided in the locking position of the locking element, whilst compensation of play for avoiding rattling noises is implemented by the further pivoting of the locking element about the third pivot axis into the clamping position.

The locking device according to the invention fulfils the requirements for safety in the event of an impact, the requirements for smooth-running and for freedom from rattling noise and all this at low cost in terms of construction.

Moreover, it goes without saying that the term "two-point bearing" is not to be understood in the mathematical sense, but that the two bearing points of the locking element on the two bearing surfaces of the locking pawl are able to have an, albeit small, physical dimension.

Regarding the arrangement of the third bearing surface it is preferable if the third bearing surface is present on the locking pawl.

In this case it is advantageous that further components for forming the third bearing surface are dispensed with. In this embodiment, the second bearing surface and the third bearing surface are namely formed integrally on the locking pawl.

As an alternative to the aforementioned embodiment, the third bearing surface is present on an element which is fixed to the housing.

This embodiment requires a further component of the device, for example in the form of a pin fixed to the housing, on which the third bearing surface is formed but also this embodiment easily fulfils the function of compensation of play to avoid rattling noises.

In a preferred embodiment, the first bearing point of the locking element presses against the second bearing surface of the locking pawl or pulls at the locking pawl.

The device according to the invention, therefore, is able to be configured in a universal manner, i.e. the locking element is able to exert the clamping force on the clamping pawl for compensating play in the form of a pulling force or in the form of a pressing force.

In a further preferred embodiment, the locking element is mounted on the second pivot axis on a pivot axis pin via a bearing eye configured as an oblong hole, the oblong hole being concentric to the third pivot axis.

This embodiment constitutes an example of an embodiment of the pivotability of the locking element about the third pivot axis which is very simple in terms of construction. Such a mounting of the locking element via an oblong hole is disclosed in the aforementioned document DE 100 48 127 B4, but in the known locking device the oblong hole is provided such that when the locking pawl exerts an opening moment on the locking element, said locking element is displaced relative to the pivot axis pin, in order to cooperate with a stop which prevents an opening of the locking element. In the device according to the invention, in contrast, the oblong hole serves for pivoting the locking element about the third pivot axis.

In a further preferred embodiment, a guide element is present, said guide element forcing the locking element, from an open position of the locking element into the locking position, to pivot exclusively about the second pivot axis.

In this case it is advantageous that the individual movements of the locking element, namely initially the pivoting of the locking element about the second pivot axis and then the pivoting about the third pivot axis, are separated from one another in a clearly defined manner so that the functional reliability and the smooth-running of the motion sequence of the movable parts of the locking device are ensured.

In a further preferred embodiment, the pivoting path of the locking element about the third pivot axis is limited by a stop.

The stop prevents a further pivoting of the locking element about the third pivot axis going beyond the clamping position of the locking element, whereby the two bearing points of the bearing surface of the locking element are reliably prevented from coming out of engagement with the second and third bearing surface. Furthermore, this measure contributes advantageously to the functional reliability of the locking device.

In a further preferred embodiment, the aforementioned guide element forms the aforementioned stop.

It is advantageous here that for the functions of guiding the locking element during its pivoting movement about the second pivot axis and for limiting the pivoting movement of the locking element about the third pivot axis, only one functional part is required, which further reduces the cost in terms of construction of the locking device according to the invention.

In a further preferred embodiment, the third pivot axis is located in the vicinity of the first bearing point of the locking element.

It is advantageous here that particularly favourable lever ratios of the force transmission are produced for clamping the locking pawl in the closed position.

In further preferred embodiments, the locking pawl is pretensioned in its open position and/or the locking element is pretensioned in its clamping position.

Said measures which are conventional per se in such locking devices, may nevertheless be implemented by smaller pretensioning forces, i.e. by smaller spring forces, in the locking device according to the invention.

In a further preferred embodiment, the locking element forms the actuating element for opening the locking pawl.

In this embodiment, the locking device according to the invention only comprises the locking element and the locking pawl as movable functional parts. An additional actuating element, as is required in some cases in the known locking devices, may be omitted here, whereby the locking device according to the invention may be produced very cost-effectively.

Further advantages and features are set forth from the following description and the accompanying drawings.

It goes without saying that the features mentioned above and to be described in more detail below are not only able to be used in the combination provided but also in other combinations or separately without departing from the scope of the present invention.

BRIEF DESCRIPTION OF THE DRAWINGS

Exemplary embodiments of the invention are shown in the drawings and are described in more detail here, with reference to the drawings, in which.

DESCRIPTION OF PREFERRED EXEMPLARY EMBODIMENTS

Figure 1:
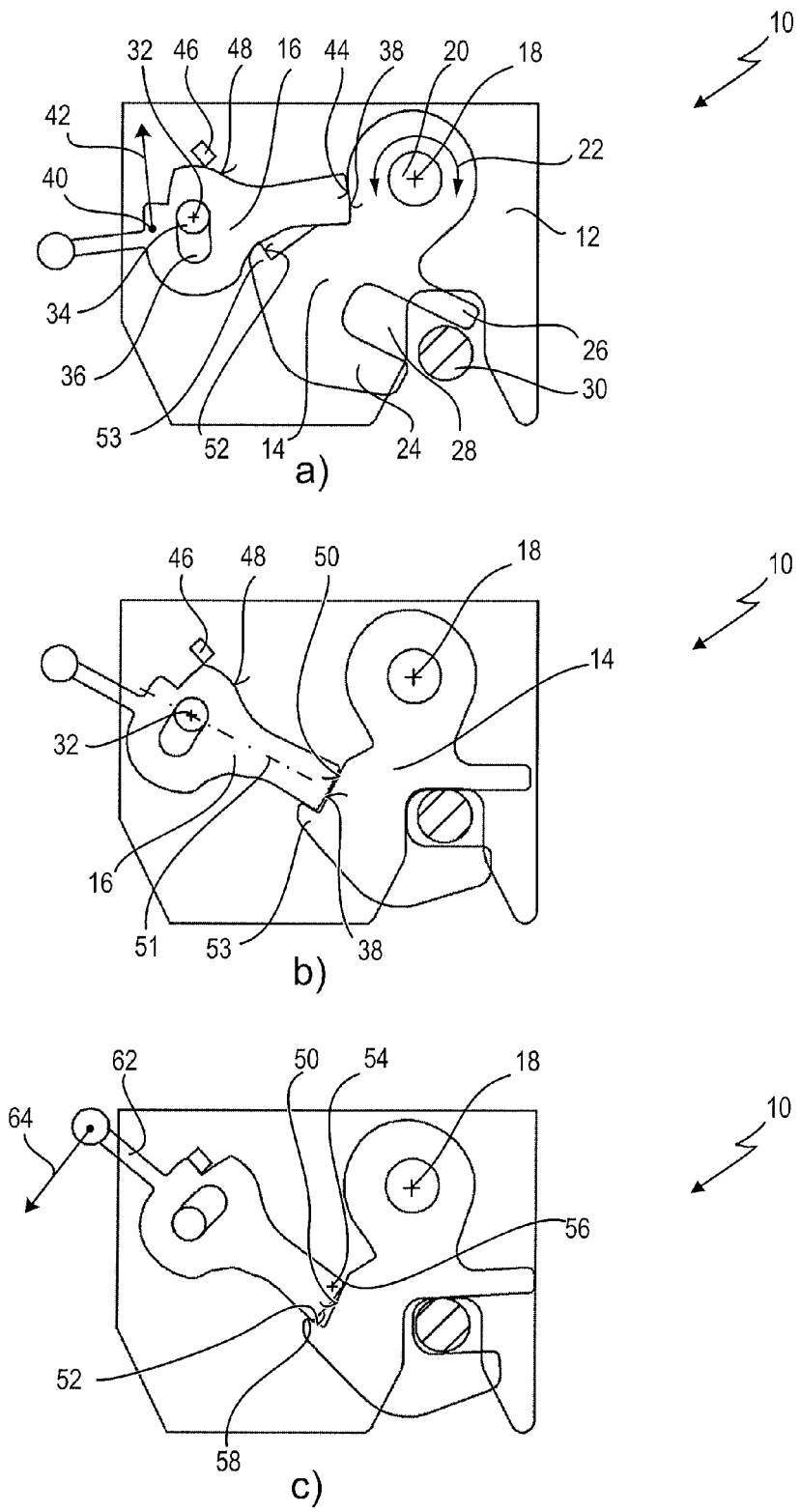
FIGS. 1a) to c) show a first exemplary embodiment of a device for locking a vehicle seat, FIG. 1a) showing a locking pawl and a locking element of the locking device in its open position, FIG. 1b) showing the locking pawl in a first pivoted position and the locking element in the locking position, and FIG. 1c) showing the locking element in the clamping position and the locking pawl in its clamped closed position.

In FIG. 1a) a device provided with the general reference numeral 10 is shown for locking a vehicle seat, not shown. The device 10 serves, for example, for anchoring the vehicle seat to the floor of a vehicle.

The device 10 comprises a housing 12 which is only shown schematically here and in a transparent manner for reasons of simplifying the illustrated view.

A locking pawl 14 and a locking element 16 are arranged in the housing 12. The locking pawl 14 and the locking element 16 are movable relative to the housing 12.

The locking pawl 14 is pivotably mounted in the housing 12 about a first pivot axis 18. The pivot axis 18 in this case is formed by an axial pin 20 on which the locking pawl 14 is pivotably mounted. The locking pawl 14 is able to be pivoted about the first pivot axis 18 clockwise and anti-clockwise, as indicated by the double arrow 22.

The locking pawl 14 comprises a jaw 28 formed between two fork limbs 24 and 26, the jaw 28 serving for coming into engagement with a fixed fitting part 30, as disclosed further below. In the event that the device 10 serves for anchoring the seat to the floor, the fitting part 30 is, for example, a bolt fixed to the bodywork of the vehicle.

The locking element 16 is configured in the form of a bar which is pivotably mounted about a second pivot axis 32. The second pivot axis 32 is formed by a pivot axis pin 34, the locking element 16 comprising a bearing eye 36 formed as an oblong hole, the longitudinal extent thereof being greater than the diameter of the pivot axis pin 34.

The locking element 16 comprises a first bearing surface 38.

A spring, not shown in further detail, acts on the locking element 16 at a point 40 indicated here by a dot, said spring exerting on the locking element 16 a pulling force which is illustrated in FIG. 1a) by an arrow 42. Instead of a pulling force, a corresponding spring could also exert a pressing force on the locking element 16.

FIG. 1a) shows the locking device 10 in its open position, i.e. the locking pawl 14 is in its open position, and the locking element 16 is also in its open position. In the open position of the locking pawl 14 the jaw 28 is free from the fitting part 30.

In this position, the first bearing surface 38 of the locking element 16 is supported against a bearing surface 44 of the locking pawl 14 and thereby prevents still further opening of the locking pawl 14.

Proceeding from the open position of the locking element 16 in FIG. 1a) a lowering of the device 10 onto the fitting part 30 causes the fork limb 26 to come to bear against the fitting part 30, whereby the locking pawl 14 is pivoted anti-clockwise about the pivot axis 18. In this case, the pulling force (arrow 42) exerted on the locking element 16 at the same time effects a pivoting of the locking element 16 about the second pivot axis 32 clockwise. This motion sequence continues until the locking element 16 has reached its locking position shown in FIG. 1b), in which the locking pawl 14 has adopted a first pivoted position, in which the locking pawl 14, more specifically the jaw 28 thereof, is already in engagement with the fitting part 30.

During the transition from the position shown in FIG. 1a) of the locking element 16 into the locking position shown in FIG. 1b) of the locking element 16, said locking element has exclusively performed a pivoting movement about the second pivot axis 32. In order to ensure this, a guide element 46 is arranged in the housing 12, along which a guide surface 48 of the locking element 16 is guided during the pivoting movement about the second pivot axis 32. The guide element 46 causes the oblong hole 36 of the locking element 16 not to be displaced in a translatory manner relative to the pivot axis pin 34, so that during the transition from the position in FIG. 1a) to the position in FIG. 1b) the slot 36 bears with the same end thereof against the pivot axis pin 34.

In the locking position of the locking element 16 according to FIG. 1b) the first bearing surface 38 of the locking element bears against a second bearing surface 50 of the locking pawl 14. In the first pivoted position of the locking pawl 14 shown in FIG. 1b) the second bearing surface 50 of the locking pawl 14 is without eccentricity relative to the second pivot axis 32 as is the bearing surface 38 of the locking element 16.

In FIG. 1b) the line of action of the force between the locking pawl 14 and the locking element 16 is shown by a line 51. The line of action of the force in this case passes through the pivot axis 32 so that the locking pawl 14 in the event of an impact is not able to exert an opening moment on the locking element 16, which could transfer the locking element 16 into its open position according to FIG. 1a).

In the operating position shown in FIG. 1b) of the locking device 10, the locking pawl 14 is locked so as to be secure in the event of an impact, but is not yet clamped. A clamping of the locking pawl 14 for compensating play is, however, desirable in order to avoid rattling noises during operation of the vehicle in which the locking device 10 is installed.

The clamping of the locking pawl 14 now takes place in the transition from the locking position of the locking element 16 in FIG. 1b) into the clamping position of the locking element 16 according to FIG. 1c).

To this end, the locking pawl 14 has, in addition to the second bearing surface 50, a third bearing surface 52 which encloses an angle of less than 180° with the second bearing surface 50 of the locking pawl 15. In the exemplary embodiment shown, the second bearing surface 50 and the third bearing surface 52 enclose an angle of approximately 90°. The third bearing surface 52 in this exemplary embodiment is thus arranged on the locking pawl 14 itself, and namely on a portion 53 which is angled relative to the second bearing surface 50.

The transition of the locking element 16 from the locking position in FIG. 1b) into the clamping position according to FIG. 1c) is occasionally effected by the pulling force (arrow 42) exerted on the locking element 16.

In the locking position shown in FIG. 1b) of the locking element 16, the guide surface 48 of the locking element 16 just comes out of engagement with the guide element 46.

During the transition from the locking position in FIG. 1b) into the clamping position according to FIG. 1c), the locking element 16 now performs a pivoting movement about a third pivot axis 54, which is located approximately in the region of the first bearing surface 38 of the locking element 16. Accordingly, during the transition from the locking position in FIG. 1b) into the clamping position according to FIG. 1c), the locking element 16 does not perform a pivoting movement about the second pivot axis 32 but about the third pivot axis 54. This pivoting movement about the third pivot axis 54 is permitted as the oblong hole 36 of the locking element 16, which is concentric to the third pivot axis 54, is now displaced relative to the pivot axis pin 34, as is revealed by a comparison of FIG. 1b) with FIG. 1c). This displacement is permitted by the guide surface 48 of the locking element 16 no longer being in engagement with the guide element 46.

The third pivot axis 54 is not a physical pivot axis but an imaginary, geometric pivot axis.

By the pivoting of the locking element 16 about the third pivot axis 54, the locking element 16 comes to bear with a first bearing point 56 against the second bearing surface 50 and with a second bearing point 58 against the third bearing surface 52. The locking element 16 thus bears against two "points" on two bearing surfaces 50 and 52, which are spaced apart from one another. The bearing points 56 and 58 are located in this exemplary embodiment at the ends of the bearing surface 38.

In this case, the pressure required for clamping the locking pawl 14 is exerted by the first bearing point 56 on said locking pawl, whilst the second bearing point 58 acts as an abutment for this pressing force.

The guide element 46 serves as a stop and thus to limit the pivoting movement of the locking element 16 about the third pivot axis 54, the limiting also being able to be implemented by the oblong hole 36 itself.

In the case of an impact, the locking pawl 14 is able to exert an opening moment on the locking element 16 which is located in its clamping position according to FIG. 1c), but the locking element is not able to be transferred beyond its locking position shown in FIG. 1b) into the open position according to FIG. 1a), as has already been described above.

For intentional opening of the locking device 10, the locking element 16 serves as an actuating element 62 which in this case is configured as a lever-like extension of the locking element 16, an exertion of force on the actuating element 62, for example directly or via a Bowden cable connection, in the direction of an arrow 64, initially pivoting the locking element 16 back about the pivot axis 54 and, with a continued exertion of force according to the arrow 64, the locking element 16 being transferred via the locking position according to FIG. 1b) into the open position according to FIG. 1a).

The locking pawl 14 is pretensioned in its open position according to FIG. 1a), i.e. the locking pawl 14 automatically performs a pivoting movement clockwise as far as its open position, when the locking element 16 is transferred from the clamping position via the locking position into the open position.

Figure 2:
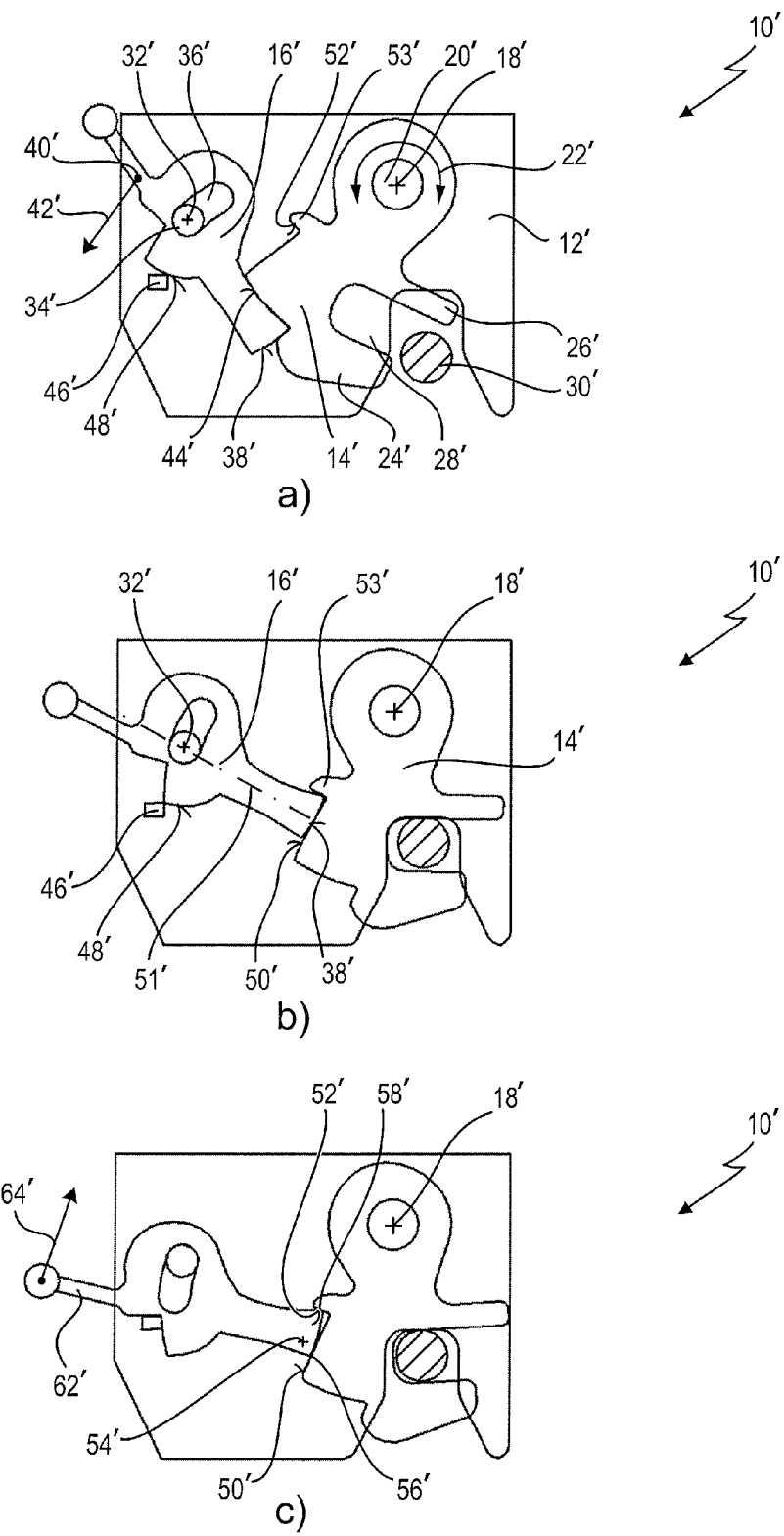
FIGS. 2a to c) show a further exemplary embodiment of a device for locking a vehicle seat, FIG. 2a) showing a locking pawl and a locking element of the locking device in its open position, FIG. 2b) showing the locking pawl in a first pivoted position and the locking element in the locking position, and FIG. 2c) showing the locking element in the clamping position and the locking pawl in its clamped closed position.

In FIGS. 2a) to 2c), a modification of the locking device 10 of FIGS. 1) to 1c) is shown, the device according to FIGS. 2a) to 2c) being provided with the reference numeral 10'. Those parts of the locking device 10' which are identical or comparable with corresponding parts of the locking device 10 are provided with the same reference numerals as the parts of the locking device 10, with the addition of the mark '.

Provided nothing contrary thereto is disclosed hereinafter, the description of the locking device 10 as regards the construction and mode of operation also applies to the locking device 10'.

The difference between the device 10' and the device 10 is that during the transition from the open position in FIG. 2a) into the locking position according to FIG. 2b) the locking element 16' does not perform a clockwise pivoting movement about the second pivot axis 32', but an anti-clockwise pivoting movement. Also, the pivoting direction of the locking element 16' about the third pivot axis 54' during the transition from the locking position into the clamping position is oriented in the anti-clockwise direction.

Accordingly, the arrangement of the second bearing surface 50' and the third bearing surface 52' is interchanged with the arrangement of the second bearing surface 50 and the third bearing surface 52 of the device 10 in the sense of the pivoting of the locking element 16' about the third pivot axis 54' anti-clockwise. Accordingly, the arrangement of the guide element 46' relative to the second pivot axis 32' is interchanged with the arrangement of the guide element 46.

Figure 3:
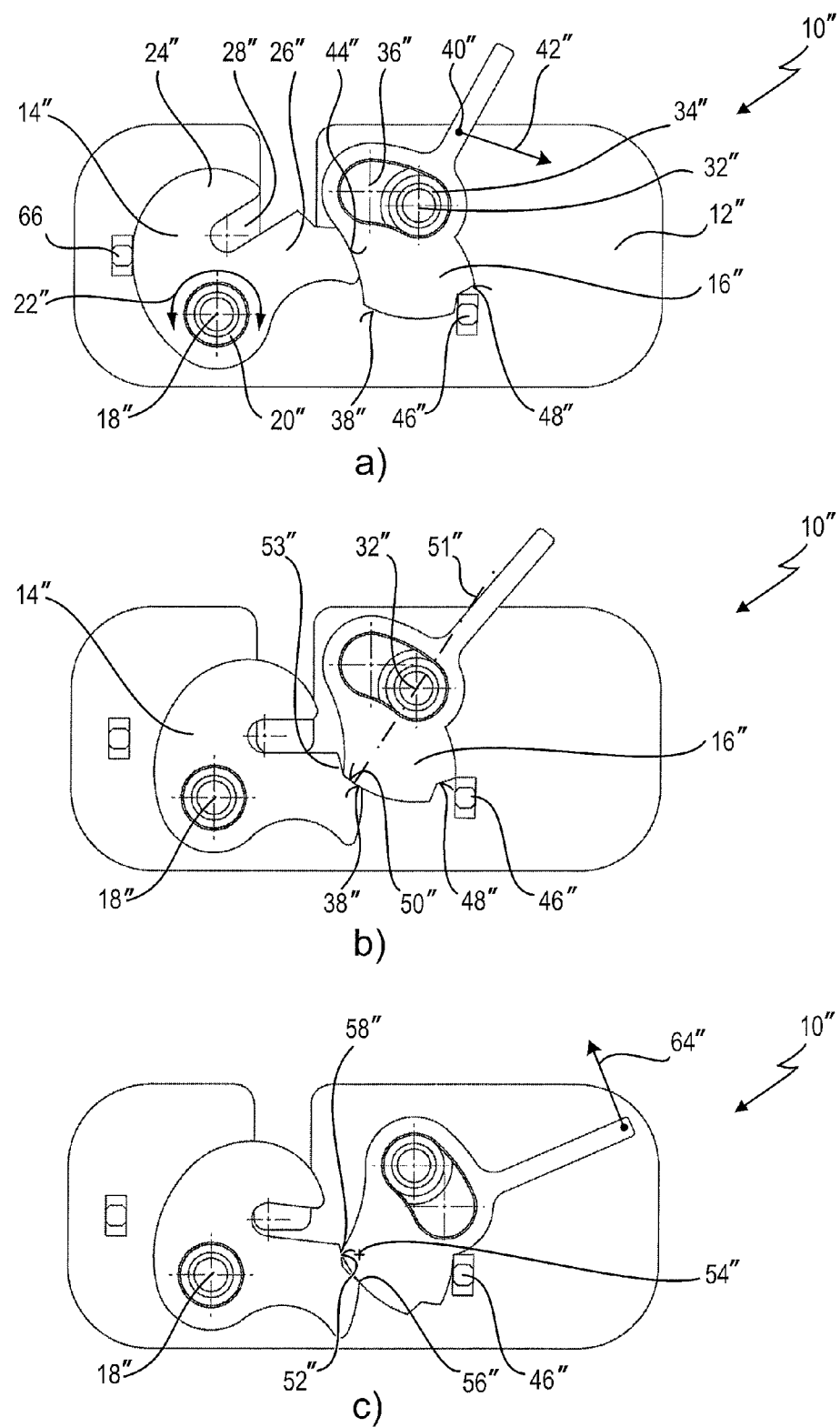
FIGS. 3a) to c) show a further exemplary embodiment of a device for locking a vehicle seat, FIG. 3a) showing a locking pawl and a locking element of the locking device in its open position, FIG. 3b) showing the locking pawl in a first pivoted position and the locking element in the locking position, and FIG. 3c) showing the locking element in the clamping position and the locking pawl in its clamped closed position.

FIGS. 3a) to 3c) show a further exemplary embodiment of a device provided with the general reference numeral 10" for locking a vehicle seat.

Such parts of the device 10", which are identical or comparable with parts of the device 10, are provided with the same reference numerals as the parts of the device 10, with the addition of the mark ".

In the device 10" the arrangement consisting of the locking pawl 14" and the locking element 16" is laterally inverted in comparison with the two devices 10 and 10'.

FIG. 3a) shows the locking pawl 14" and the locking element 16" in their open position. FIG. 3b) shows the locking element 16" in the locking position, in which the first bearing surface 38" bears against the second bearing surface 50", the first bearing surface 38" of the locking element 16" and, in the first pivoted position of the locking pawl 14" shown in FIG. 3b), the second bearing surface 50" of the locking pawl 14" extending without eccentricity relative to the second pivot axis 32". During the transition of the locking element 16" from the locking position according to FIG. 3b) into the clamping position according to FIG. 3c) the locking element 16" comes to bear with a first bearing point 56" against the second bearing surface 50" of the locking pawl 14" and with a second bearing point 58" against the third bearing surface 52" of the locking pawl 14", in order to clamp the locking pawl 14" in the closed position. In this exemplary embodiment, the first bearing point 56" is located on the bearing surface 38". The angle between the two bearing surfaces 50" and 52" is in this case approximately 150°.

In the device 10" a further stop 66 for the locking pawl 14" is provided which merely has the function of ensuring a defined open position for the locking pawl 14" according to FIG. 1a), whilst in the devices 10 and 10' this function is performed by the locking element 16 and/or 16'.

In the exemplary embodiments above, the third bearing surface 52, 52' and/or 52" is formed in each case on the locking pawl 14, 14' and/or 14" itself.

Figure 4:
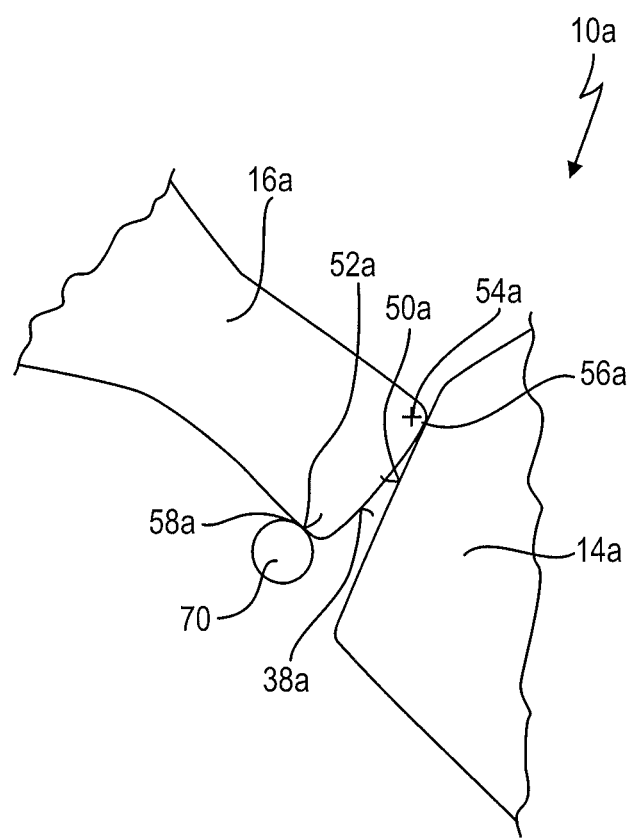
FIG. 4 shows an exemplary embodiment which has been modified relative to FIGS. 1a) to c), the locking element shown in detail being shown in the locking position and the locking pawl shown in detail being shown in its clamped closed position.

In FIG. 4, a modification of the device 10 in FIGS. 1a) to 1c) is shown in detail, the device 10a according to FIG. 4 being identical to the device 10, with the exception of the modification to be described below. Accordingly, the device 10a is only shown in the region of the modification. For such parts of the device 10a which are identical or comparable with parts of the device 10, the same reference numerals have been used, with the addition of the letter "a".

In the device 10a the third bearing surface 52a is not formed on the locking pawl 14a but on an element 70 fixed to the housing, which in this case is configured, for example, as a pin fixed to the housing. In the clamping position of the locking element 16a said locking element comes to bear with the first bearing point 56a against the second bearing surface 50a of the locking pawl 14a, and with the second bearing point 58a against the third bearing surface 52a on the element 70 fixed to the housing. FIG. 4 accordingly shows the device 10a in the clamping position of the locking element 16a in which the locking pawl 14a is clamped in its closed position.

Figure 5:
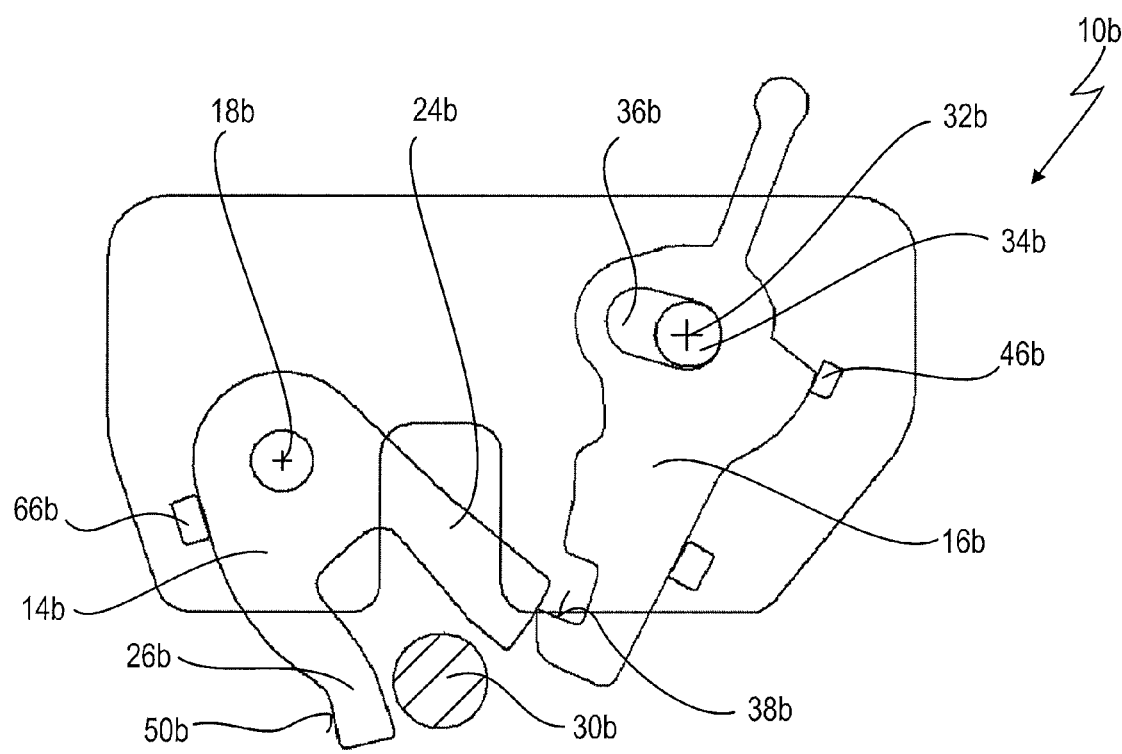
FIGS. 5a) to d) show a further exemplary embodiment of a device for locking a vehicle seat, FIG. 5a) showing a locking pawl and a locking element in their open positions, FIG. 5b) showing a transition position of the locking element and the locking pawl towards the locking position, FIG. 5c) showing the locking pawl in a first pivoted position and the locking element in the locking position, and FIG. 5d) showing the locking element in the clamping position and the locking pawl in its clamped closed position.
Figure 5:
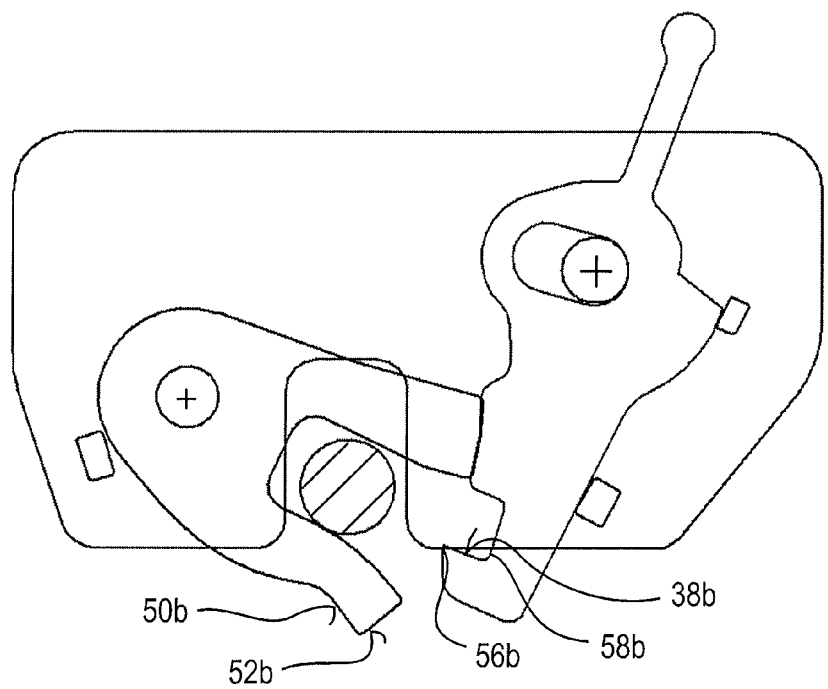
Figure 5:
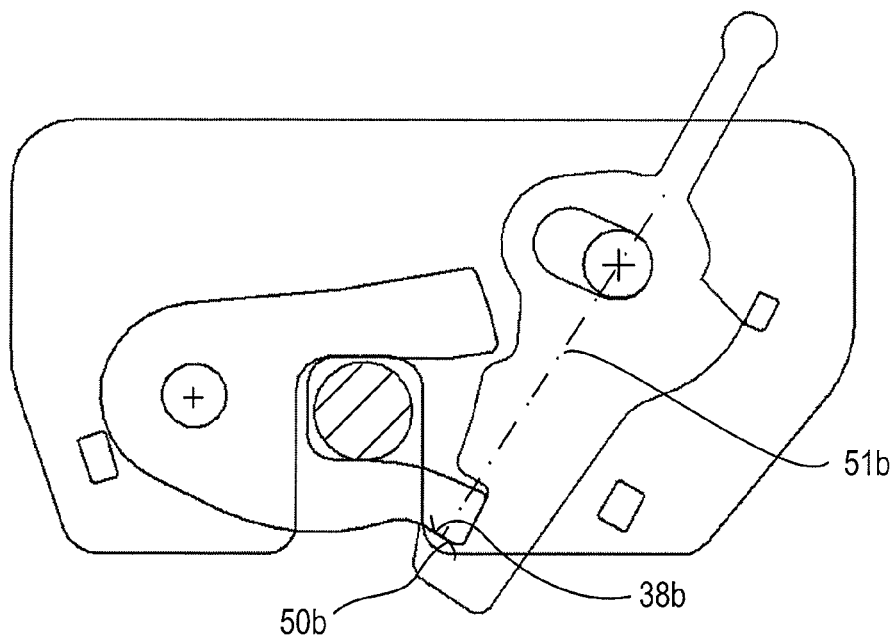
Figure 5:
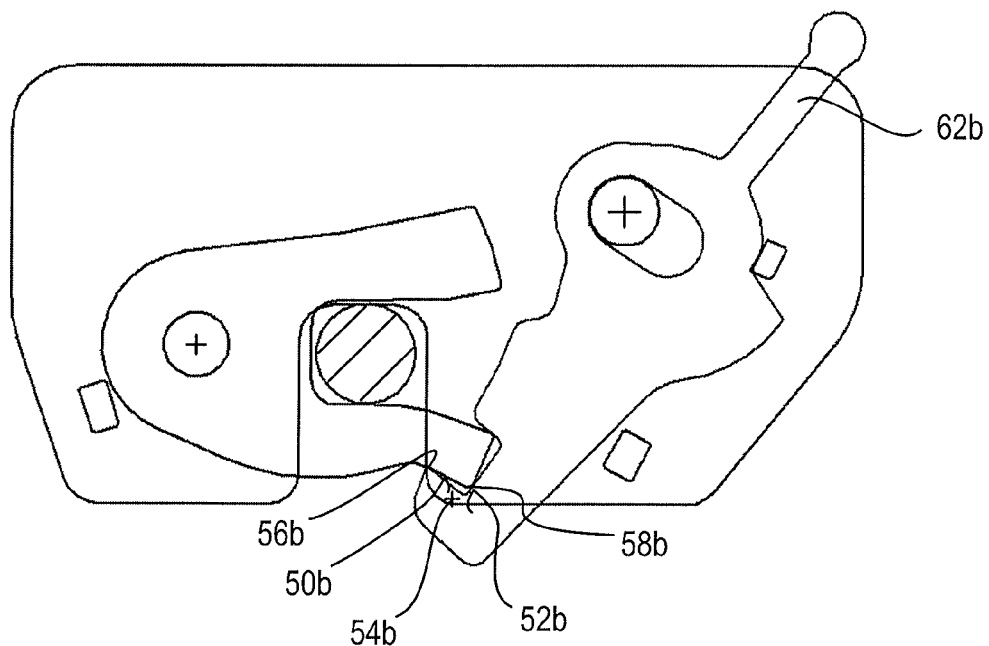

In FIGS. 5a) to d) a further exemplary embodiment of a device 10b for locking a vehicle seat is shown. Such parts of the device 10b which are identical or comparable with corresponding parts of the locking device 10 are provided with the same reference numerals as the parts of the locking device 10, with the addition of the letter "b".

In the above exemplary embodiments the respective locking element 16, 16', 16" and/or 16a operates by pressing against the locking pawl 14, 14', 14" and/or 14a, in order to lock the locking pawl 14, 14', 14" and/or 14a in the locking position in a manner which is safe in the event of impact and to clamp the locking pawl in the clamping position for the compensation of play.

In the device 10b, however, the locking element 16b cooperates with the locking pawl 14b by pulling, in order to effect the aforementioned sequences.

FIG. 5a) shows the locking element 16b and the locking pawl 14b in their fully open position.

By lowering the device 10b onto the fitting part 30b initially the locking pawl 14b pivots anti-clockwise about the first pivot axis 18b, by the fork limb 24b coming to bear against the fitting part 30b. The locking pawl 14b in this case adopts the intermediate position shown in FIG. 5b), whilst the locking element 16b) during the transition from FIG. 5a) to FIG. 5b) has not yet pivoted or has not yet pivoted to any great extent about the second pivot axis 32b. In the position according to FIG. 5b) the locking pawl 14b is not yet locked. Only during the transition from the position according to FIG. 5b) into the locking position of the locking element 16b according to FIG. 5c), the locking element 16b being pivoted clockwise, does the first bearing surface 38b of the locking element 16b come to bear against the second bearing surface 50b of the locking pawl 14b. In this first pivoted position of the locking pawl 14b, the second bearing surface 50b and the first bearing surface 38b are without eccentricity relative to the second pivot axis 32b.

In the locking position of the locking element 16b according to FIG. 5c) the locking pawl 14b is locked in a manner which is safe in the event of an impact, in FIG. 5c) the line of action of the bearing force between the bearing surfaces 38b and 50b extending along the line 51b through the pivot axis 32b.

In the transition from the locking position according to FIG. 5c), the locking element 16b is transferred by pivoting about the third pivot axis 54b into its clamping position according to FIG. 5d). In this clamping position, the locking element 16b bears with a first bearing point 56b against the second bearing surface 50b, and with a second bearing point spaced apart from the first bearing point 56b against the third bearing surface 52b, which is also formed on the locking pawl 14b.

The first bearing point 56b is located at the outer end of the first bearing surface 38b and the third bearing surface 52b is in this case formed by the outer corner of the fork limb 26b of the locking pawl 14b.

What is claimed is:

1. A device for locking a vehicle seat, the device comprising:
- a locking pawl, said locking pawl being in engagement with a fitting part in a closed position and being free from the fitting part in an open position,
- a first pivot axis, the locking pawl being pivotable about the first pivot axis,
- a locking element,
- a second pivot axis, the locking element being pivotable about the second pivot axis,
- a first bearing surface present on the locking element and a second bearing surface present on the locking pawl, wherein the first bearing surface bears against the second bearing surface when the locking element is in a locking position, thereby locking the locking pawl in a first pivoted position in which said locking pawl is in engagement with the fitting part,
- the first bearing surface and the second bearing surface being without eccentricity relative to the second pivot axis in the first pivoted position of the locking pawl,
- a third pivot axis, the locking element being pivotable about the third pivot axis, the third pivot axis being produced by the movement sequence of the locking element during transition from the locking position into a clamping position,
- a third bearing surface present on the locking pawl, wherein the locking element, when proceeding from the locking position into the clamping position, pivots about the third axis with the locking pawl in the closed position such that the locking element comes to bear with a first bearing point against the second bearing surface of the locking pawl and comes to bear with a second bearing point spaced apart from the first bearing point against the third bearing surface of the locking pawl, thereby clamping the locking pawl in the closed position.

2. The device of claim 1, wherein at the first bearing point the locking element presses against the second bearing surface of the locking pawl.

3. The device of claim 1, wherein at the first bearing point the locking element pulls at the locking pawl.

4. The device of claim 1, wherein the locking element has a bearing eye configured as an oblong hole, and the locking element is mounted on the second pivot axis on a pivot axis pin via the bearing eye, the oblong hole being concentric to the third pivot axis of the locking element.

5. The device of claim 1, further comprising a guide element, the guide element forcing the locking element, from an open position of the locking element into the locking position, to pivot exclusively about the second pivot axis.

6. The device of claim 1, wherein a pivoting path of the locking element about the third pivot axis is limited by a stop.

7. The device of claim 5, wherein a pivoting path of the locking element about the third pivot axis is limited by a stop, wherein the guide element forms the stop.

8. The device of claim 1, wherein the third pivot axis is located in proximity to the first bearing point of the locking element.

9. The device of claim 1, wherein the locking pawl is pretensioned in its open position.

10. The device of claim 1, wherein the locking element is pretensioned in its clamping position.

11. The device of claim 1, further comprising an actuating element for opening the locking pawl, the locking element forming the actuating element.

* * * * *